(12) United States Patent
Huang et al.

(10) Patent No.: US 10,481,711 B2
(45) Date of Patent: Nov. 19, 2019

(54) ARRAY SUBSTRATE AND TOUCH DISPLAY

(71) Applicant: Wuhan China Star Optoelectronics Technology Co., Ltd., Wuhan, Hubei (CN)

(72) Inventors: Yao-li Huang, Guangdong (CN); Hongsen Zhang, Guangdong (CN); Pan Yang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 209 days.

(21) Appl. No.: 15/301,245

(22) PCT Filed: Jul. 20, 2016

(86) PCT No.: PCT/CN2016/090607
§ 371 (c)(1),
(2) Date: Sep. 30, 2016

(87) PCT Pub. No.: WO2018/000479
PCT Pub. Date: Jan. 4, 2018

(65) Prior Publication Data
US 2018/0203551 A1 Jul. 19, 2018

(30) Foreign Application Priority Data
Jun. 28, 2016 (CN) .......................... 2016 1 0486646

(51) Int. Cl.
*G06F 3/041* (2006.01)
*G06F 3/044* (2006.01)
(52) U.S. Cl.
CPC ............ *G06F 3/0412* (2013.01); *G06F 3/044* (2013.01); *G06F 2203/04112* (2013.01)

(58) Field of Classification Search
CPC ......... G06F 3/0412; G06F 2203/04112; G06F 3/044
See application file for complete search history.

(56) References Cited

U.S. PATENT DOCUMENTS 8,110,432 B1 * 2/2012 Marks .................. H01L 51/102
257/E21.259
9,933,899 B2 * 4/2018 Yang ...................... G06F 3/044
(Continued)

FOREIGN PATENT DOCUMENTS

CN 203480490 U 3/2014
CN 104461201 A 3/2015
(Continued)

*Primary Examiner* — Antonio Xavier
(74) *Attorney, Agent, or Firm* — Andrew C. Cheng

(57) ABSTRACT

An array substrate comprises the plurality of gate lines and matrix arranged touch electrodes, which each of the touch electrodes has a plurality of sub electrodes, and each of the sub electrode and the gate line extend along the first direction, the plurality of the sub electrode are arranged in spaced arrangement along the second direction. The first direction and the second direction are perpendicular each other, and the plurality of the sub electrodes electrically connected to each other by the first touch trace, and the shadow of the gate line on the touch electrode is between two of the sub electrodes. The touch electrode is separated into the plurality of sub electrode arranged in spaced arrangement. The shadow of the gate line on the touch electrode is between the two sub electrodes, and the touch electrode avoids the gate line.

14 Claims, 2 Drawing Sheets

(56) References Cited

U.S. PATENT DOCUMENTS

| | | | | |
|---|---|---|---|---|
| 10,146,349 | B2* | 12/2018 | Tsai | G09G 3/3233 |
| 2004/0108819 | A1* | 6/2004 | Arai | G02F 1/163 |
| | | | | 315/169.3 |
| 2010/0123681 | A1 | 5/2010 | Wu et al. | |
| 2012/0313881 | A1* | 12/2012 | Ge | G02F 1/13338 |
| | | | | 345/174 |
| 2014/0152579 | A1* | 6/2014 | Frey | G06F 3/044 |
| | | | | 345/173 |
| 2016/0162084 | A1* | 6/2016 | Wang | G06F 3/0412 |
| | | | | 345/173 |
| 2016/0170538 | A1* | 6/2016 | Wang | G06F 3/0412 |
| | | | | 345/173 |
| 2016/0188030 | A1* | 6/2016 | Xie | G06F 3/0412 |
| | | | | 345/174 |
| 2016/0253022 | A1* | 9/2016 | Liu | G06F 3/0416 |
| | | | | 345/173 |
| 2016/0291755 | A1* | 10/2016 | Li | G06F 3/0412 |
| 2018/0113541 | A1* | 4/2018 | Xie | G02F 1/1343 |
| 2018/0157129 | A1* | 6/2018 | Shi | G06F 3/0412 |

FOREIGN PATENT DOCUMENTS

| | | |
|---|---|---|
| CN | 104699321 A | 6/2015 |
| KR | 20150077161 A | 7/2015 |

\* cited by examiner

ARRAY SUBSTRATE AND TOUCH DISPLAY

CROSS REFERENCE

The present invention request for the priority of an earlier application of the application number 201610486646.4 of the invention name "Array Substrate and Touch Display" on Jun. 28, 2016. The earlier application content is quoted in the present invention.

FIELD OF THE INVENTION

The present invention relates to the touch display technology field, more specifically, to the array substrate and touch display.

BACKGROUND OF THE INVENTION

With the development of the TDDI (Touch Display Driver Integration) technology of the self-capacitance touch display, the common electrode layer of the array substrate of the display panel uses to be the touch electrode layer for self-capacitance touch detection. According to the time-sequential drive, and the time-sequential control of the touch and the display, it achieves the touch and the display at the same time. To integrate the touch circuit into the display directly, it reduces the cost a lot, improves the efficiency of production, and reduces the thickness of the panel.

When the common electrode are used as the touch electrode, the common electrode needs to be separated into the plurality of independent common electrodes. At the same time, to realize the time-sequential control of touch and display, each touch electrode provides the signal by passing through an individual touch electrode line. By passing through the individual touch electrode line, the touch signal is provided to a corresponded touch electrode at the touch period and the driving voltage is provided to the corresponded touch electrode at the display period. In the current self-capacitance touch display, the capacitive coupling forms between the common electrode and gate line, and it increases the loading of the touch electrode and decreases touching sensitivity.

SUMMARY OF THE INVENTION

The present disclosure provides an array substrate to reduce the touch electrode load, to improve the touch sensitivity, and to improve the touch performance of the in-cell touch display.

Another object of the invention provides the array substrate used in the touch display.

To achieve the purpose, the embodiment of the invention provides the technical solution:

The invention provides an array substrate, comprising a plurality of gate lines and matrix arranged touch electrodes, and each of the touch electrodes has a plurality of sub electrodes, and each sub electrode and the gate line extend along a first direction. The plurality of sub electrodes are arranged along a second direction in spaced arrangement. The first direction and the second direction are perpendicular to each other. The plurality of sub electrodes electrically connects to each other by a first touch trace, a projection of the gate line on the touch electrode is between the two sub electrodes.

A through hole is disposed in each of the sub electrode. The first touch trace and the sub electrode are disposed in the different conducting layers, and the first touch trace is electrically connected to the sub electrode via the through hole.

Each of the sub electrodes has the plurality of through holes arranged along the first direction.

In each of the touch electrodes, the plurality of through holes along the second direction are connected by the first touch trace.

The number of the first touch trace is plural, and the plurality of the first touch traces extend along the second direction.

The present disclosure further comprises 1 touch driving unit and a second touch trace, each of the touch electrodes electrically connects to the touch driving unit by the second touch trace.

Two of the nonadjacent first touch traces connect to one of the second and connect to the touch driving unit through the second touch trace.

The gate line and the touch electrode are disposed in the different conducting layers, where the gate line is located under the touch electrode.

Each of the gate lines corresponds to one of the sub electrodes.

The disclosure further provides a touch display comprising an array substrate, wherein the array substrate has the plurality of gate lines and matrix arranged touch electrodes, wherein each of the touch electrodes has the plurality of sub electrodes, each of the sub electrodes and the gate lines extend along the first direction, and the plurality of sub electrodes are arranged along the second direction in spaced arrangement. The first direction and the second direction are perpendicular to each other. The plurality of sub electrodes electrically connected to each other by the first touch trace, and the projection of the gate line on the touch electrode is between the two sub electrodes.

The through hole is disposed in each of the sub electrodes, and the first touch trace and the sub electrode are disposed in the different conducting layers, and the first touch trace electrically connects to the sub electrode by the through hole.

the plurality of through holes is arranged on each of the sub electrodes along the first direction.

In each of the touch electrodes, the plurality of through holes along the second direction are connected by the first touch trace.

The number of the first touch trace is plural, and the plurality of the first touch trace extend along the second direction.

The present disclosure comprises the touch driving unit and the second touch trace, each of the touch electrodes is electrically connected to the touch driving unit by the second touch trace.

Two of the nonadjacent first touch traces and the second touch trace are connected, and the first touch traces is connected to the touch driving unit by the second touch trace.

The gate line and the touch electrode are disposed in the different conducting layers, wherein the gate line is located under the touch electrode.

Each of the gate lines corresponds to one of the sub electrodes.

The embodiment of the invention has benefit or advantage as follows:

The touch electrode is separated into the plurality of sub electrodes arranged in spaced arrangement. The projection of the gate line on the touch electrode is between the two sub electrodes, and the touch electrode avoids the gate line.

Without changing the size of the touch electrode, it decreases the capacity between the gate line and the touch electrode, and further decreases the noise of other signals when touching. It increases the touch sensitivity and reduces the touch response time. The touch display of the invention has the advantage of high touch sensitivity and short response time.

BRIEF DESCRIPTION OF THE DRAWINGS

In order to clearly illustrate the embodiment of the invention or the technical solution of the current technology, the drawings illustrate the embodiments and the current technology; obviously the descriptions of the drawings are embodiments of the invention. According to the drawings, the person skilled in the art will obtain others without any creative efforts.

DETAILED DESCRIPTION OF THE PREFERRED EMBODIMENTS

The description of the technical solution of the embodiment of the invention is illustrated clearly and completely by combination of the drawings in the embodiment of the invention, obviously, the embodiment is part of the embodiments of the invention, not all embodiments. According to the embodiment of the invention, the person skilled in the art will obtain others embodiments without any creative efforts, it belongs the scope of the invention.

Figure 1:
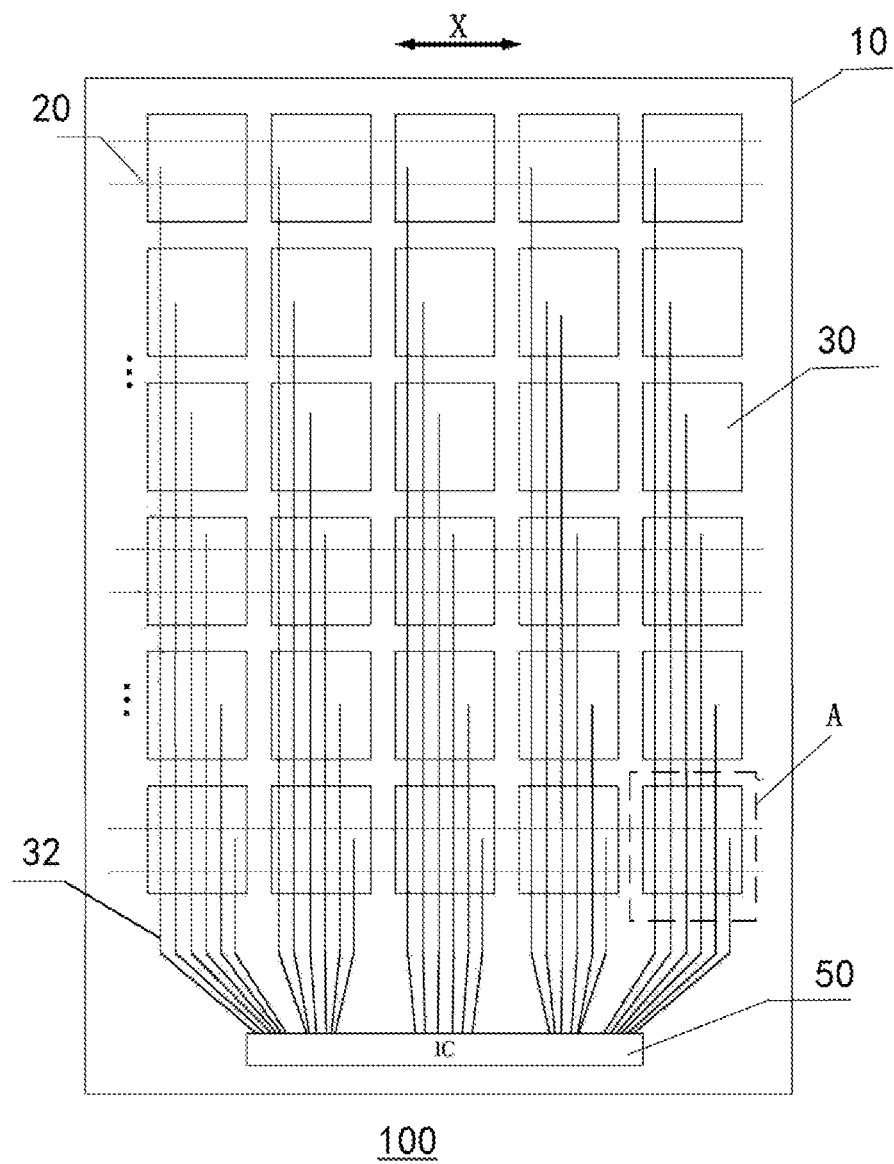
FIG. 1 illustrates the structure of the array substrate of the invention.

Referring to FIG. 1, the array substrate 100 is disclosed. The array substrate 100 comprises substrate 10, a plurality of gate line 20, a plurality of touch electrode 30, a plurality of second touch trace 32 and a touch driving unit 50. The plurality of gate lines 20 are arranged along the first direction X. The plurality of touch electrode 30 is arranged in an array on the substrate 10, each touch electrode 30 respectively connects to the touch driving unit 50 by the second touch trace 32 corresponding to the touch electrode 30. The touch driving unit 50 provides the touch sensing signal to the touch electrode 30 in the touch period and provides the common voltage to the touch electrode 30 in the display period, and transmits to the touch electrode 30 by the second touch trace 32.

Figure 2:
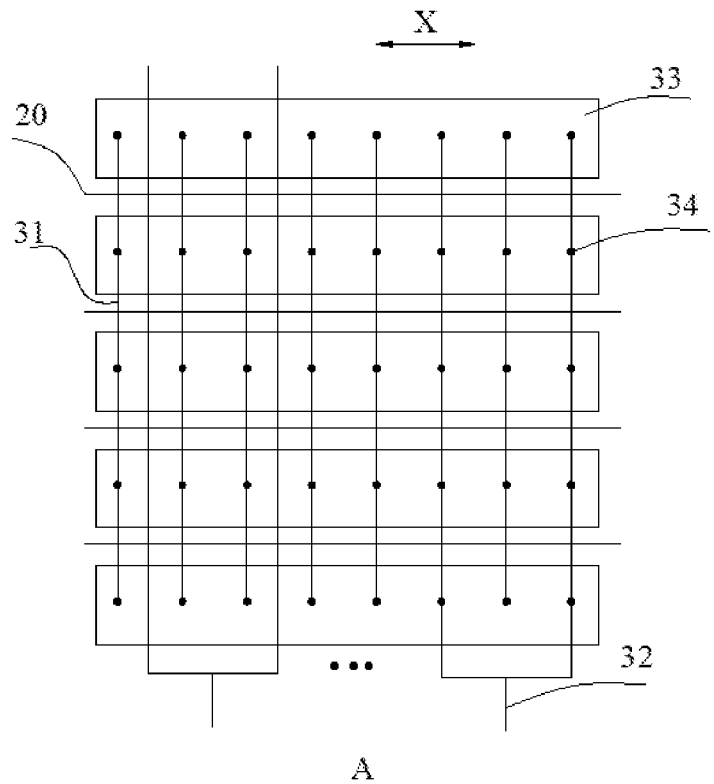
FIG. 2 demonstrates the enlarged drawing of A in FIG. 1.

Referring to FIG. 2, the touch electrode 30 of the disclosure is separated into a plurality of sub electrodes 33, and the plurality of sub electrodes 33 are arranged in spaced arrangement along the second direction. The second direction and the first direction X are perpendicular to each other. The extending direction of each of the sub electrodes 33 and the extending direction of the gate line 20 are the same direction. The sub electrodes 33 of the same touch electrode 30 are electrically connected by using the first touch trace 31. A projection of the gate line 20 on the touch electrode 30 is between the two sub electrodes 33.

Using the 5.5" touch display to estimate to prove the technical effort of the invention, C1 is defined as the capacitance between the touch electrode and the gate line; C2 is defined as the capacitance between the second touch trace and the gate line; C3 is defined as another capacitance (includes the sum of the capacitance between the touch electrode and the data line, between the second touch trace and the data line, and between the touch electrodes.); R1 is defined as the resistance of the second touch trace, shown as the following table:

| Touch electrode structure | C1 (PF) | C2 (PF) | C3 (PF) | R (Ω) |
|---|---|---|---|---|
| Whole piece (current technology) | 21.95 | 0.0037 | 125.68 | 2518 |
| bar (present invention) | 0 | 0.0037 | 125.68 | 2518 |

Figure 3:
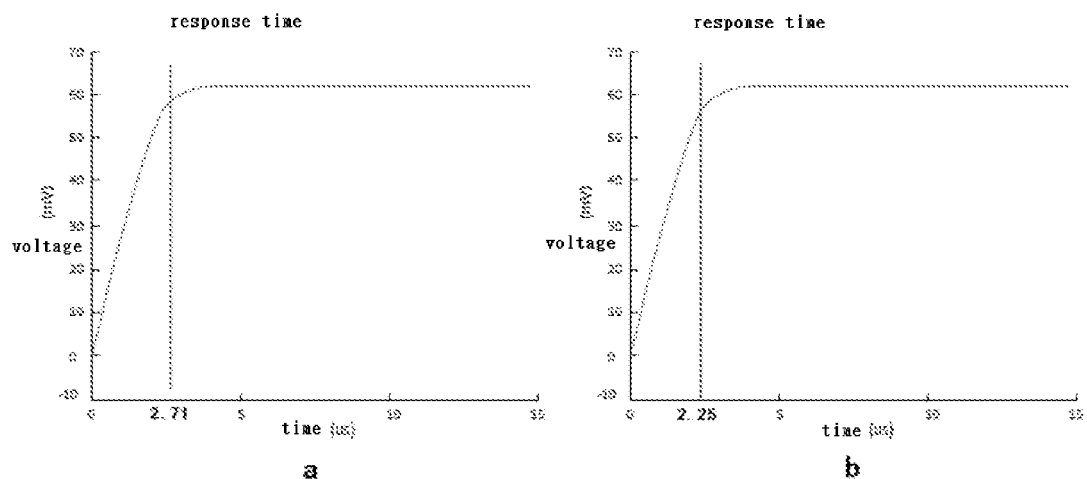
FIG. 3 shows the graph of the simulation experiment.

Referring to FIG. 3 is the analog simulation result of the simulation software inputted the parameter above. FIG. a is the simulation result of the current technology, the touch electrode is connected each other in whole piece, the response time is 2.71 us. FIG. b is the simulation result of the present invention, because of the capacitance C1 between the touch electrode and the gate line is zero (C1=0), the response time is 2.25 us. According to FIG. 3, the design solution of the invention improves the more touch response time than the current technology. In the invention, it doesn't change the process and increase the masks, the capacitance load (C loading) is decrease, the response time is shorted at the same time, the touch sensitivity is improved, and the touch performance is increased.

In summary, the invention separates the touch electrode into plurality of sub electrodes arranged in spaced arrangement. The projection of the gate line on the touch electrode is between the two sub electrodes, and the touch electrode avoids the gate line. Without changing the size of the touch electrode, it decreases the capacity between the gate line and the touch electrode, and further decreases the noise of other signals when touching. It increases the touch sensitivity, and shorts the touch response time.

Specifically, referring to FIG. 2 which illustrates the embodiment of the invention, the first touch trace 31 and the sub electrode 33 are disposed in the different conducting layer, thus each of the though hole 34 is disposed in the sub electrode 33. The first touch trace 31 and the sub electrode 33 are electrically connected by the through hole 34. Furthermore, a plurality of through holes 34 are disposed in the sub electrode 33, and the plurality of through holes 34 are arranged uniformly along the first direction X. In other words, the touch electrode 30 comprises the plurality of through holes 34 arranged in an array. The through holes 34 of the same column in the touch electrode 30 are electrically connected by the first touch trace 31. In other words, in each touch electrode 30, the through holes 34 in the direction (the second direction) perpendicular to the first direction X are electrically connected by the first touch trace 31. It's to be understood the number of the first touch trace 31 are plural, and the plurality of the first touch traces 31 extend along the second direction.

It can be understood that the size, the shape and the number of the sub electrode 33 in the touch electrode 30 are not limited by the embodiment of the present invention. For example, the touch electrode 30 is separated into 5 sub electrodes 33 in one of the embodiments of the present invention and the present invention is not limited thereto.

It's to be understood that the number of the through holes 34 in each sub electrode 33 is not limited. Obviously, the larger number of the through holes, the higher touch sensitivity, and the traces are more complex, the cost is larger.

In the embodiment of the invention, two of the nonadjacent first touch traces 31 and the second touch trace 32 are connected, and connected to the touch driving unit 50 by the second touch trace 32. It's to be understood that the larger number of the first touch traces 31 connected to the second touch trace 32, the more stable touch will be, but the more traces are needed, and the cost is higher. In the embodiment, two of the nonadjacent first touch traces is disposed for the purpose of high touch stable.

It's to be understood that the materials of the plurality of first touch trace 31 and the plurality of second touch trace 32 could be metal wire. The resistance of the touch traces is the same for ensuring the signal transmission performance.

The gate line 20 and the touch electrode 30 is disposed in the different conducting layers, wherein the conducting layer of the gate line 20 is under the conducting layer of the touch electrode 30. Specifically, in the same touch electrode 30, each gate line 20 corresponds to one of the sub electrodes 33.

The first touch trace 31, the plurality of second touch traces 32 and the gate lines 20 is disposed in the same conducting layer.

The invention provides a touch display, comprising the color filter substrate and the array substrate disposed relatively, the array substrate could be any array substrate 100 described above. The touch display could be applied in the electronic paper, LCD, mobile phone, digital photo frame, tablet, and any product or part with touch display features. The touch display is not limited in the field described above.

In the description of the specification, the term "one embodiment", "some embodiments", "example", "specific example", "some examples" means the specific feature, structure, material, or characteristic included in at least one of the embodiment or example of the invention. In the specification, the term of the above representation is not necessary referring to the same embodiment or example. And the description of the specific feature, structure, material, or characteristic could be combined suitably in one or the plurality of the embodiments or examples.

The embodiment descript above is not limit the protection range of the technical solution. Any modification, equivalent replacement, and improvement within the spirit and principle of the embodiment includes in the protection range of the technical solution.

What is claimed is:

1. An array substrate, comprising a plurality of gate lines and matrix arranged touch electrodes, wherein each of the touch electrodes has a plurality of sub electrodes, and each of the sub electrodes and the gate lines are extended along a first direction, the plurality of the sub electrodes are arranged in spaced arrangement along a second direction, the first direction and the second direction are perpendicular to each other, the plurality of the sub electrodes are electrically connected to each other by a plurality of first touch traces, a projection of each of the gate lines on the touch electrode is between two of the sub electrodes, wherein, one of the first touch traces is electrically connected to each of the sub electrodes of one of the touch electrodes such that all the sub electrodes of the one of the touch electrodes are electrically connected to each other, all the sub electrodes of the one of the touch electrodes are grouped together without disposing any other one of the touch electrodes between adjacent two of the sub electrodes of the one of the touch electrodes, and a second touch trace which is connected to a touch driving unit is branched to connect to non-adjacent two of the first touch traces of the one of the touch electrodes.

2. The array substrate of claim 1, wherein a through hole is disposed in each of the sub electrodes, the first touch trace and the sub electrodes are disposed in different conducting layers, and the first touch trace and the sub electrodes are electrically connected by the through hole.

3. The array substrate of claim 2, wherein a plurality of through holes are disposed on each of the sub electrodes along the first direction.

4. The array substrate of claim 3, wherein in each of the touch electrodes, the plurality of through holes along the second direction are connected by the first touch trace.

5. The array substrate of claim 1, wherein a number of the first touch trace is plural, and the plurality of the first touch traces extend along the second direction.

6. The array substrate of claim 1, wherein the gate lines and the touch electrodes are disposed in different conducting layers, and the gate lines are located under the touch electrodes.

7. The array substrate of claim 1, wherein each of the gate lines corresponds to one of the sub electrodes.

8. A touch display, comprising an array substrate, the array substrate has a plurality of gate lines and matrix arranged touch electrodes, wherein each of the touch electrodes has a plurality of sub electrodes, each of the sub electrodes and the gate lines extend along a first direction, the plurality of sub electrodes are arranged in a second direction with spaced arrangement, the first direction and the second direction are perpendicular to each other, the plurality of sub electrodes are electrically connected to each other by a first touch trace, and a projection of each of the gate lines on the touch electrode is between the two sub electrodes, wherein, one of the first touch traces is electrically connected to each of the sub electrodes of one of the touch electrodes such that all the sub electrodes of the one of the touch electrodes are electrically connected to each other, all the sub electrodes of the one of the touch electrodes are grouped together without disposing any other one of the touch electrodes between adjacent two of the sub electrodes of the one of the touch electrodes, and a second touch trace which is connected to a touch driving unit is branched to connect to non-adjacent two of the first touch traces of the one of the touch electrodes.

9. The touch display of claim 8, wherein a through hole is disposed in each of the sub electrodes, the first touch trace and the sub electrodes are disposed in different conducting layers, and the first touch trace and the sub electrodes are electrically connected by the through hole.

10. The touch display of claim 9, wherein a plurality of through holes are disposed on each of the sub electrodes and arranged along the first direction.

11. The touch display of claim 10, wherein in each of the touch electrodes, the plurality of through holes along the second direction are connected by the first touch trace.

12. The touch display of claim 8, wherein a number of the first touch trace is plural, and the plurality of the first touch traces extend along the second direction.

13. The touch display of claim 8, wherein the gate lines and the touch electrodes are disposed in different conducting layers, and the gate lines are located under the touch electrodes.

14. The touch display of claim 8, wherein each of the gate lines corresponds to one of the sub electrodes.

* * * * *